United States Patent
Wilson et al.

(10) Patent No.: US 6,278,479 B1
(45) Date of Patent: Aug. 21, 2001

(54) DUAL REALITY SYSTEM

(75) Inventors: Phillip C. Wilson, Villanova; Erik A. Martin, Huntingdon Valley, both of PA (US)

(73) Assignee: Wilson, Hewitt & Associates, Inc., Philadelphia, PA (US)

( * ) Notice: Subject to any disclaimer, the term of this patent is extended or adjusted under 35 U.S.C. 154(b) by 0 days.

(21) Appl. No.: 09/028,319

(22) Filed: Feb. 24, 1998

(51) Int. Cl.⁷ ........................... H04N 13/02; H04N 15/00
(52) U.S. Cl. ........................... 348/47; 382/106; 382/154
(58) Field of Search ........................... 382/154, 106; 702/150, 151, 152, 153; 348/42, 47, 53, 139; 358/107; H04N 13/02, 15/00

(56) References Cited

U.S. PATENT DOCUMENTS

| | | | |
|---|---|---|---|
| 4,396,945 | * 8/1983 | DiMatteo et al. | 358/107 |
| 4,402,053 | 8/1983 | Kelley | 364/513 |
| 4,573,191 | 2/1986 | Kidode et al. | 382/1 |
| 4,649,425 | 3/1987 | Pund | 358/88 |
| 4,654,872 | 3/1987 | Hisano et al. | 382/1 |
| 4,737,972 | 4/1988 | Schoolman | 378/41 |
| 4,791,478 | 12/1988 | Tredwell et al. | 358/88 |
| 4,853,771 | 8/1989 | Witriol et al. | 358/93 |
| 4,884,219 | 11/1989 | Waldren | 364/514 |
| 5,072,218 | 12/1991 | Spero et al. | 340/980 |
| 5,259,037 | 11/1993 | Plunk | 382/1 |
| 5,311,203 | 5/1994 | Norton | 345/7 |
| 5,320,538 | 6/1994 | Baum | 434/307 |
| 5,321,416 | 6/1994 | Bassett et al. | 345/8 |
| 5,368,309 | 11/1994 | Monroe et al. | 273/437 |
| 5,394,517 | 2/1995 | Kalawsky | 395/129 |
| 5,423,554 | 6/1995 | Davis | 273/437 |
| 5,424,556 | 6/1995 | Symosek et al. | 250/561 |
| 5,444,790 | 8/1995 | Kamada et al. | 382/190 |
| 5,488,675 | 1/1996 | Hanna | 382/284 |
| 5,495,576 | 2/1996 | Ritchey | 395/125 |
| 5,499,306 | 3/1996 | Sasaki et al. | 382/291 |
| 5,526,812 | 6/1996 | Dumouline et al. | 128/653.1 |
| 5,530,420 | 6/1996 | Tsuchiya et al. | 340/435 |
| 5,684,531 | * 11/1997 | Li et al. | 348/139 |
| 5,699,444 | * 12/1997 | Palm | 382/106 |
| 5,850,469 | * 12/1998 | Martin et al. | 382/154 |
| 5,889,550 | * 3/1999 | Reynolds | 348/139 |

OTHER PUBLICATIONS

Hearn, D., and Baker, M. Pauline, *Computer Graphics* (Second Edition), pp. 49–53, 1994.

* cited by examiner

*Primary Examiner*—Howard Britton
*Assistant Examiner*—Nhon T Diep
(74) *Attorney, Agent, or Firm*—Volpe and Koenig, P.C.

(57) ABSTRACT

An apparatus for merging real and virtual images in which points in three dimensions of an actual scene are obtained and selected in a random fashion and in a number sufficient to track the movement of the three dimensional scene relative to an observer wearing the apparatus. Updating of selected points occurs responsive to movement of a video camera pair observing the actual scene. The position and orientation of the unit housing the video camera pair is utilized to properly merge a generated virtual image with the real image. Selection of points and orientation of the unit relative to a three dimensional real image are obtained in real time. Microprocessor-based apparatus is utilized to perform the method of the invention.

2 Claims, 10 Drawing Sheets

DUAL REALITY SYSTEM

FIELD OF THE INVENTION

The present invention relates to personal display systems and more particularly to a display system which uniquely combines both virtual and real images in "real time".

BACKGROUND OF THE INVENTION

Virtual reality systems are presently in widespread use and typically comprise a headset display which presents an image which is generated to simulate a real image (hence, "virtual" reality). Virtual reality systems lack the capability of presenting real images and especially lack the capability of presenting virtual images combined with real images and especially in "real time".

BRIEF DESCRIPTION OF THE INVENTION

The present invention provides a dual reality (DR) system which is characterized by providing apparatus and a process in which computer generated objects and images similar to those created by virtual reality systems, appear to the participant in the real world.

Similar to virtual reality, the dual reality environment is presented to the observer by way of a headset or visor which, similar to the virtual reality visor, provides a virtual image, and, in addition thereto, presents a stereoscopic view of the real environment through the employment of a pair of cameras coupled to the visor through a computer to present a stereoscopic view of the real environment to the participant through the visor.

The computer performs triangulation calculations which determine the distances from the visor to the selected navigational points to determine the position and orientation of the visor, which process will hereinafter be referred to as "visual navigation".

As one example, a computer generated object, such as a ball, viewed through the dual reality visor appears to float in front of the wearer. The observed surroundings are coupled to the visor display from the cameras and present a view of the actual surroundings as opposed to a computer generated display (i.e., a computer generated display of the actual surroundings.

The system employs environment mapping which can, for example, generate an image of the ball which appears to bounce on a real table in front of the participant or against real walls of a room that the participant is observing.

The dual reality system and method utilizes three basic components which include:

(a) a visual navigation technique which determines the location and orientation of the dual reality system in a real three-dimensional space utilizing random points selected from an observed field of view;

(b) the dual reality superimposition technique superimposes computer generated objects with images of the real three-dimensional space. An observer wearing a dual reality headset employing visual navigation can walk around a computer generated object in his or her real surroundings, observing the object from all sides. Hereafter, computer generated objects and images will be referred to as supplemental objects or collectively as supplemental reality;

(c) environment mapping is the process by which supplemental objects are caused to "interact" with the real environment and with the observer identifying surfaces (such as walls, tables, panels, hands, etc.) in three-dimensional space wherein mathematical rules govern the interaction of supplemental objects with objects or surfaces in the real environment.

OBJECTS OF THE INVENTION

It is therefore one object of the present invention to provide a display which presents to an observer a dual reality image in which a computer generated image is superimposed with and reacts with a real image.

Another object of the present invention is to provide a display to an observer in which random points selected from a field of view are utilized to determine the location and orientation of the observer in a real three-dimensional space.

Still another object of the present invention is to provide a dual reality image presented to an observer by way of a visor worn by the observer, which dual reality image presents a computer generated image (virtual image) interacting with an actual three-dimensional image.

Still another object of the present invention is to provide a dual reality display presenting a virtual image interacting with a real, three-dimensional image wherein the interaction is obtained in accordance with pre-determined mathematical rules which govern the interaction.

BRIEF DESCRIPTION OF THE FIGURES

The above as well as other objects of the present invention will become apparent when reading the accompanying description and drawings in which.

DETAILED DESCRIPTION OF THE INVENTION AND PREFERRED EMBODIMENTS THEREOF

Figure 1:
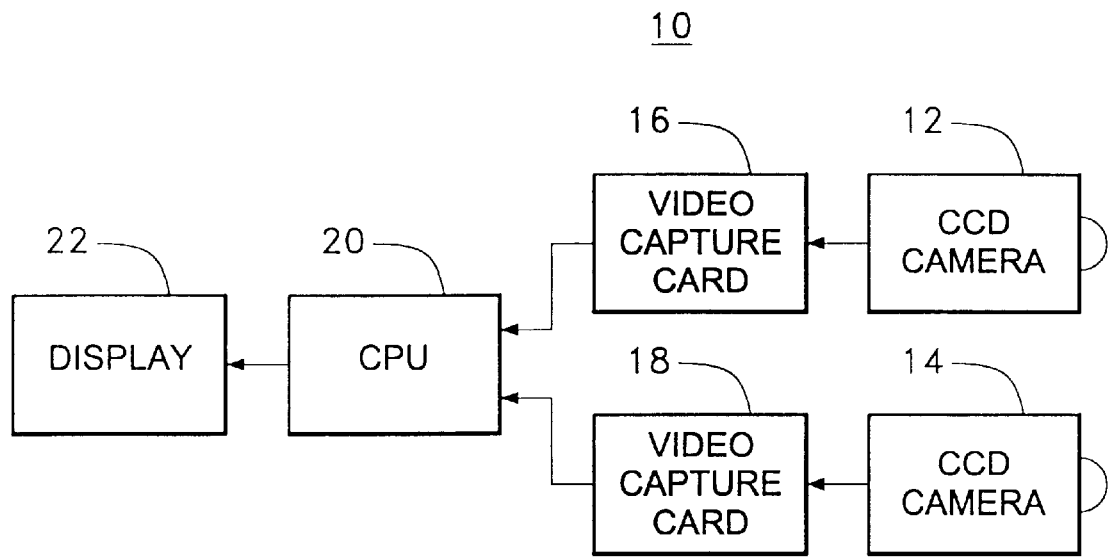
FIG. 1 is a block diagram showing a dual reality operating system.

FIG. 1 shows a dual reality system 10 in simplified block diagram form which is comprised of two cameras 12 and 14 having imaging systems preferably comprised of charge coupled devices (CCDs) each respectively coupled to at least one video capture card 16, 18. The video capture cards each enable an associated CPU 20, which may be one or more than one computer, to convert the video input to screen pixels whereby the video images can be analyzed in a memory as well as being displayed on a screen 22.

The system is preferably designed to be completely self-contained either in a headset 24 (see FIG. 1a) or a small backpack or sidepouch 24a coupled to unit 24 by a wire W or by a wireless transmitter/receiver combination. The system may also utilize a wireless communication link between the headset and a medium or large size computer remote from the headset.

Visual Navigation

Figure 1A:
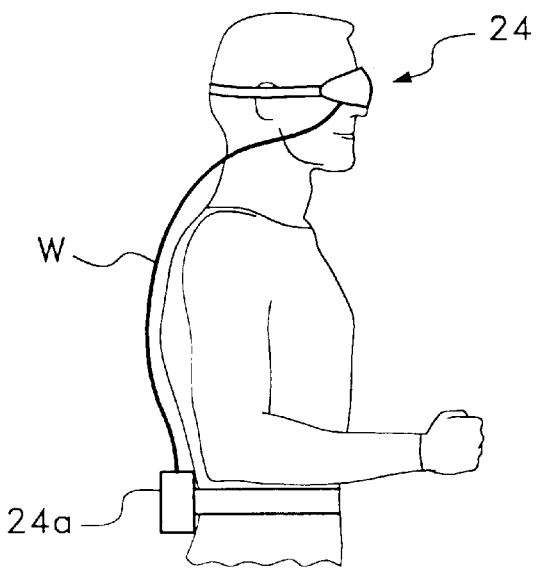
FIG. 1a shows a head set mounted upon a participant.

Visual navigation is utilized to determine location and orientation. The observer, as shown in FIG. 1a wears a headset 24. The orientation of the observer's head (the observer's viewing direction), in much the same way as an observer views a real environment through the naked eye, serves to direct the cameras 12, 14 to view the real environment so as to assume substantially the same location and orientation.

Definition of a "point"

The camera views the real environment and identifies a point on the surface of the environment as a small square grid of pixels, comprising sufficiently few pixels to most likely be part of only one physical object, and a sufficient number of pixels to reliably and uniquely identify that point and which may, as one example, be a 20×20 grid of pixels normally found, for example, in a conventional CCD imaging device, for example, of the type employed in video cameras.

A distinguishing characteristic of a point is a pattern of relative brightness and/or color within the small square grid.

During a point selection cycle, points are selected randomly using a mathematical algorithm. Any point which cannot be relocated during the next cycle of point selection is rejected. To be relocated, a point must match the previous point in birghtness/color in the location found significantly better than in any other location.

Definition of Visual Navigation

Employing the pair of cameras 12 and 14, a stereoscopic video input from the cameras is utilized to mathematically determine both position and orientation of the dual reality unit DRU 24.

Employing a starting point and absolute position as a reference, the position and orientation of unit 24 over time is determined by observing and tracking multiple, visibly distinguishable points within the field of view. Although in theory the system can work with as few as four points, for practical purposes the minimum number of points should fall within a range of 10 to 20. An increase in the number of points increases the accuracy of the system but tends to slow the system down. It is therefore a compromise between the number of points desired for accuracy weighed against a desired system speed.

"Visually distinguishable points" are defined as points with distinct patterns that can be relocated in the same general area within the field of view on subsequent search scans.

Tracking Points

The dual reality unit ("DRU") 24 maintains a constant number of points at all times, which points are located within its field of view. The unit tracks points by scanning the field of view looking for the same patterns in the same general area. An entire scan or iteration of the field of view is completed every thirty milliseconds. In order for the DRU 24 to match a point from iteration to iteration, there must be one and only one position in the same general area which stands out as the best match for the pattern.

A randomly selected point will be discarded for any of the following three reasons:

(a) the point moved out of the field of view and therefore is no longer useful for tracking (i.e., as the wearer turns his head to the right, points on the trailing edge of the field of view (the left edge) cease to exist and subsequent iterations as they leave the field of view, whereas points closer to the center or leading edge (the right edge) will survive for a greater number of iterations.

(b) the point was not on a fixed object; the point shifted, losing its distinguishing pattern (e.g., the point was on a moveable object such as an individual's shirt and the individual turned around); or the point moved differently relative to the other point selected (e.g., the point was on a moveable object such an individual shirt and the individual moved to the right while other points remained in a constant position or moved in concert to the left, as would be the case if the participant moved his head to the right and the individual in his field of view also moved to the right);

(c) the point did not contain a pattern unique enough to be tracked (e.g., a blank wall may be initially selected but would soon be rejected since the point would be located at multiple positions throughout the field of view).

Every time a point is discarded, a new point is randomly selected in the field of view. If the new point does not contain a sufficiently unique pattern, it will only survive one iteration, after which time another point will be selected.

The random selection is achieved by use of a random signal generator which randomly selects a new point by means of a standard mathematical formula seeded by the system clock of the microprocessor.

Calculation of Point Locations In Three Dimensions

Of the points that have proven reliable as a result of having existed for a number of iterations (e.g., 20 iterations—$\frac{2}{3}$ of a second), the DRU 24 calculates the location of those points in three dimensions which is accomplished by matching the point originally located by the right side camera ("camera A", for example, camera 14) in the left-side camera ("camera B", for example, camera 12).

Starting on the left perimeter of the general area of the field of view in which an original pattern is located, camera B scans to the right until a matching pattern is found, or the right perimeter of the field of view is reached, in which case the point is rejected. The triangulation calculation to be described hereinbelow is performed if one and only one perfect match is found. Using this match, the DRU 24 determines three (3) angles, as follows:

Angle a: from camera A to the point along the x-axis;

Angle b: from camera A to the point along the y-axis;

Angle c: from camera B to the point along the x-axis.

The angle from camera B to the point along the y-axis is the same as the angle from camera A to the point along the y-axis.

Using the above angles, the distance between the detected point and camera A is calculated employing analytic geometry and trigonometry. The position of the point will then be defined in terms of the position and orientation of camera A, which information is converted into relative Cartesian coordinates of that point in space, using the position and orientation of camera A as the reference for the Cartesian space.

Calculating Movement of the DRU Through Space

The relative Cartesian coordinates derived for each point from the most recent iteration are transferred to a separate calculation module in the computer which determines the movement of the unit 24 through space. The module performs the necessary calculations to determine the absolute position and orientation of unit 24. In calculating these values, the module uses relative Cartesian coordinates for points contained only in the current iteration and the absolute Cartesian coordinates for any points contained in the current iteration to which was assigned an absolute Cartesian coordinate in the previous iteration. A detailed description of the calculations will be set forth hereinbelow.

The participant's position is calculated relative to the participant's starting position (i.e. relative to the position and orientation of the unit 24 worn by the participant), and the point positions and the participant's position are described in terms of absolute and relative coordinates. From all points the transfer to the calculation module, ten sets of four points are each selected in a random fashion by means of a standard mathematical formula seeded by the system clock of the micro-processor. For each of ten sets of four points, the relative and absolute Cartesian coordinates are placed in a series of equations which, using analytic geometry, trigonometry, and basic matrix operations, provide a result set containing the absolute position and orientation of unit 24. Each result set is then compared with every other result set, and a subset of a specific number of sets which most agree with each other are averaged together. This average result set represents the absolute position and orientation of unit 24.

Visual Navigation Calculations

The sequence of calculations is as follows:

Establishing the Absolute Basis and Position of the Unit in the Absolute Basis

The term "basis" is a mathematical term defined as a "frame of reference".

Figure 4:
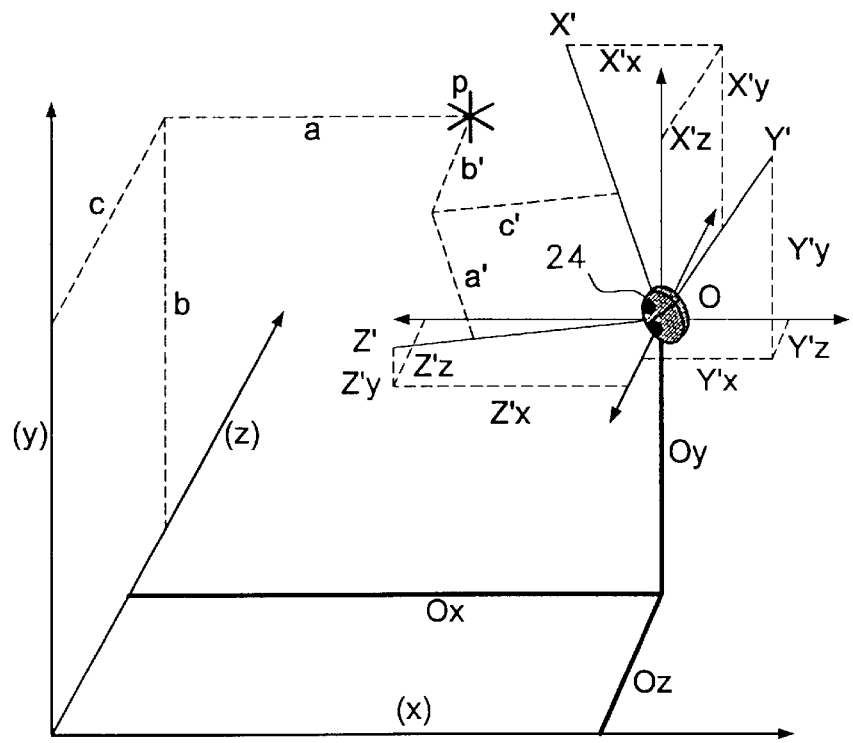
FIGS. 4 through 16 are series of two and three-dimensional plots useful in describing the techniques of the present invention.

The Absolute Basis is defined by the x, y and z axes. The position of unit 24 in this basis is defined as O (Ox, Oy, Oz). See FIG. 4.

Determining the DRU Basis and Orientation in Absolute Basis

Figure 5:
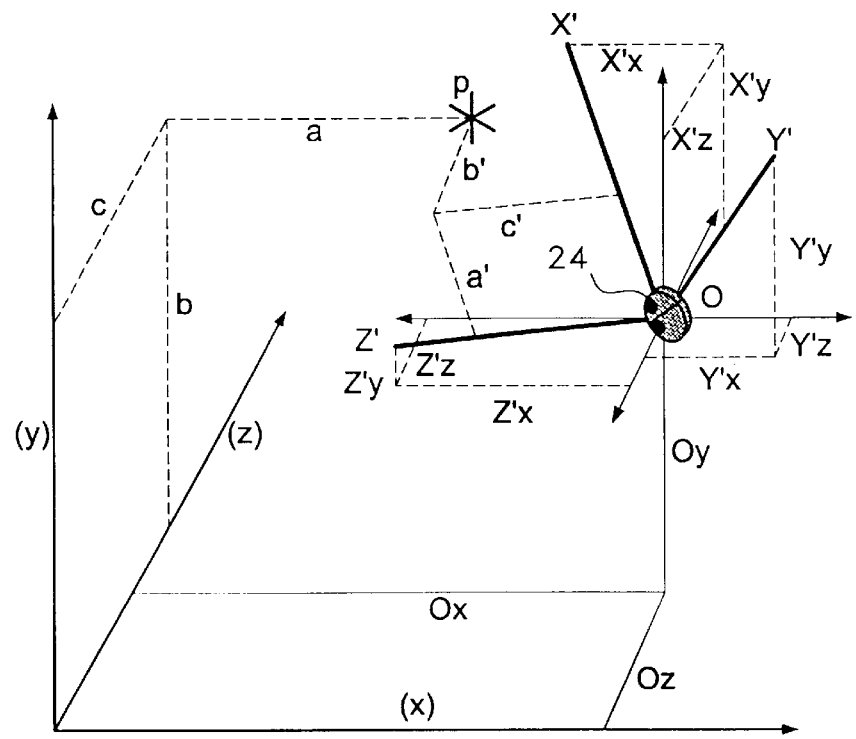

The unit Basis is defined by the vectors X', Y' and Z'. The view of the unit 24 points along the Z' vector and the Y' vector extends upwardly through the top of unit 24. The orientation of the unit in Absolute Basis is defined by (see FIG. 5):

X' is defined by the components (X'x, X'y, X'z),

Y' is defined by the components (Y'x, Y'y, Y'z)

Z' is defined by the components (Z'x, Z'y, Z'z) and

X', Y', AND Z' are all unit vectors, i.e., they all have unit length.

Figure 6:
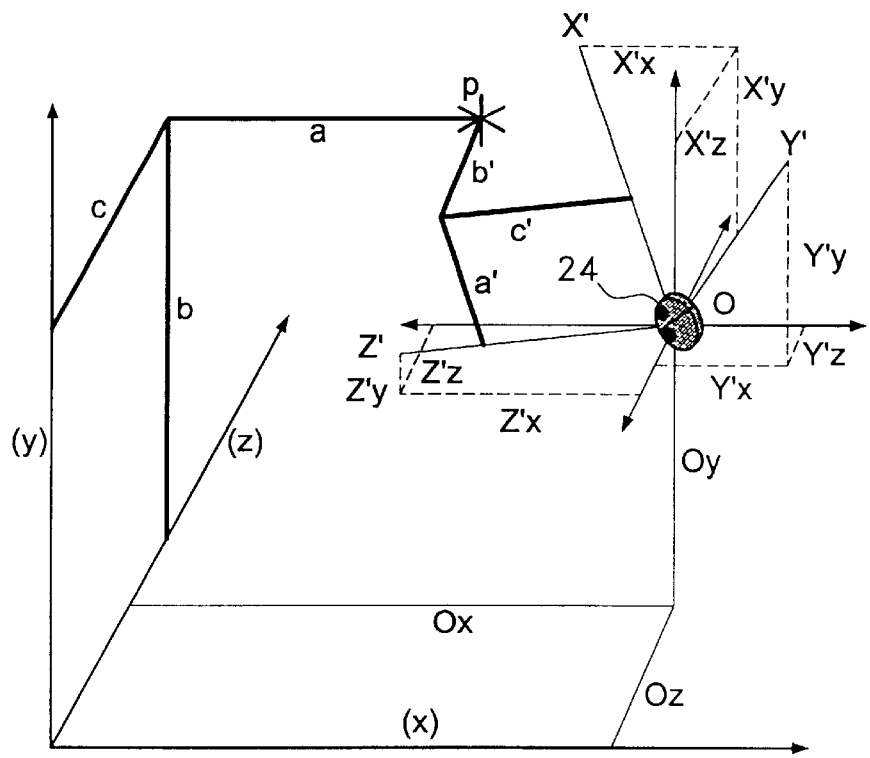
Figure 7:
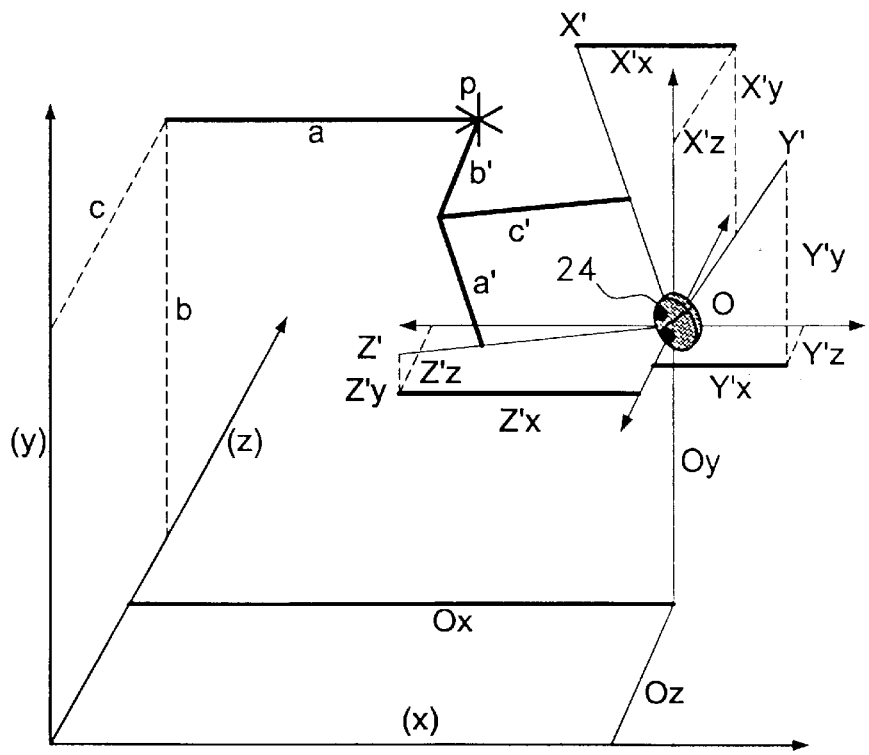
Figure 8:
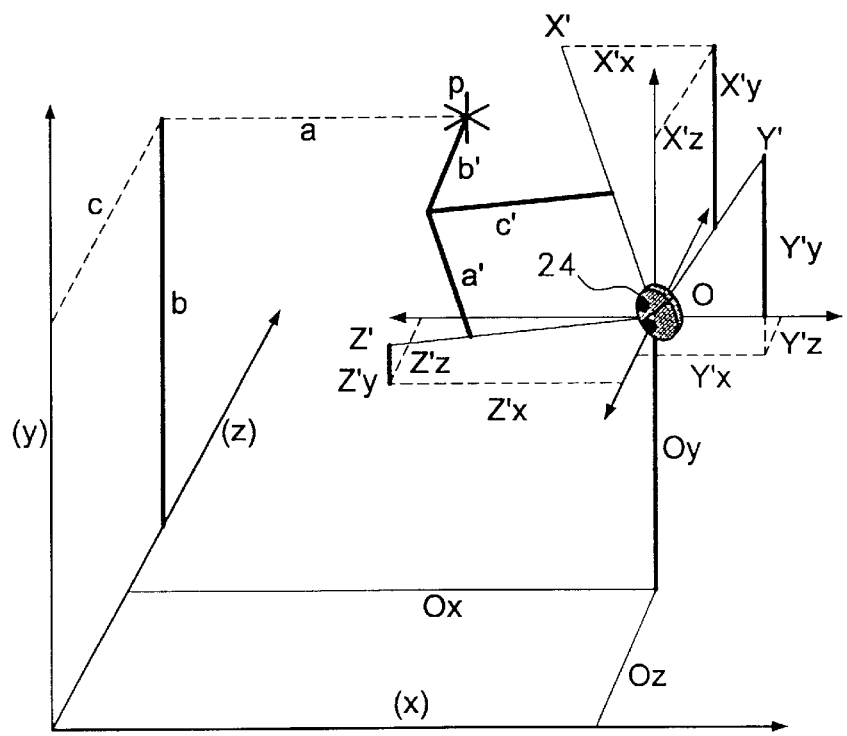
Figure 9:
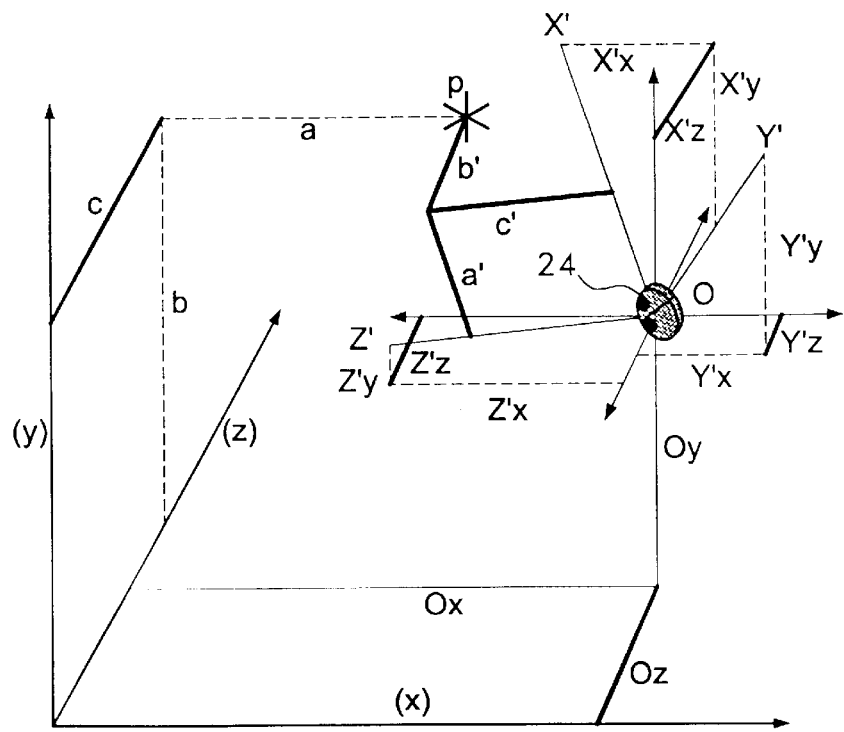

Determining the Position of a Point in both the Absolute Basis and the DRU Basis An observed object or point is defined as p, with a position (a, b, c) in the Absolute Basis, and a position (a', b', c') in the DRU Basis. See FIG. 6.

Determining the Relationship between the Position of p in the Absolute Basis and the Position of p in the DRU Basis Vector addition defines the relationship between p(a, b, c), and p(a', b', c'), as the following set of equations:

Equation Set A $$a = (X'x)(a') + (Y'x)(b') + (Z'x)(c') + Ox \quad \text{Equation 1:}$$

(FIG. 7)

$$b = (X'y)(a') + (Y'y)(b') + (Z'y)(c') + Oy \quad \text{Equation 2:}$$

(FIG. 8)

$$c = (X'z)(a') + (Y'z)(b') + (Z'z)(c') + Oz \quad \text{Equation 3:}$$

(FIG. 9)

By observing points with known absolute positions, these equations establish the DRU Basis (X', Y', Z'), and the position of the DRU 24 in the Absolute Basis (O). This is the essence of Visual Navigation.

Determining the DRU Basis and the Position of the DRU in the Absolute Basis

Overview of Initial Process: Establishing the DRU basis and the Initial Position of the DRU in the Absolute Basis When the DRU is first turned on, the values of X' are set to a unit vector extending along the positive x axis (1,0,0), the value of Y' is set to a unit vector along the positive y axis (0,1,0), and the value of Z' is set to a unit vector along the positive z axis (0,0,1), and O is set to (0,0,0). Thus, the DRU Basis and the position of the DRU in the Absolute Basis are established.

The first process the DRU will go through is the initial observation of points. At least four points are required ($p_1$–$p_4$) to determine the DRU Basis and the position of the DRU in the Absolute Basis, although the DRU generally observes a minimum of between 10 and 20 points.

As $p_1$–$p_4$ are selected by the DRU, their positions in the Absolute Basis [$p_1(a_1, b_1, c_1)$, $p_2(a_2, b_2, c_2)$ $p_3(a_3, b_3, c_3)$, $p_4(a_4, b_4, c_4)$] are set to the same value of their positions in the DRU Basis [$p_1(a'_1, b'_1, c'_1)$, $p_2(a'_2, b'_2, c'_2)$, $p_3(a'_3, b'_3, c'_3)$, $p_4(a'_4, b'_4, c'_4)$] and stored in the computer.

Overview of Secondary Process: Establishing the Position of the DRU in the Absolute Basis Over Time The DRU then goes through the process of tracking points, using the following calculations:

Starting with Equation 1 of Equation Set A, four (4) points ($p_1$–$p_4$) are selected to solve for position and orientation. The following equations result:

Equation System 1 (based on Equation 1 using ($p_1$–$p_4$)

$$a_1 = (X'x)(a'_1) + (Y'x)(b'_1) + (Z'x)(c'_1) + Ox \quad \text{Equation 5:}$$

$$a_2 = (X'x)(a'_2) + (Y'x)(b'_2) + (Z'x)(c'_2) + Ox \quad \text{Equation 6:}$$

$$a_3 = (X'x)(a'_3) + (Y'x)(b'_3) + (Z'x)(c'_3) + OX \quad \text{Equation 7:}$$

$$a_4 = (X'x)(a'_4) + (Y'x)(b'_4) + (Z'x)(c'_4) + OX \quad \text{Equation 8:}$$

To solve this system of equations, the coefficients ($a_1$–$a_4$, $a'_1$–$a'_4$, $b'_1$–$b'_4$, $c'_1$–$c'_4$, and 1) are placed in a matrix, moving the first column to the end:

Matrix 1 (based on Equation 1 using ($p_1$–$p_4$))

$$\begin{vmatrix} a'_1 & b'_1 & c'_1 & 1 & a_1 \\ a'_2 & b'_2 & c'_2 & 1 & a_2 \\ a'_3 & b'_3 & c'_3 & 1 & a_3 \\ a'_4 & b'_4 & c'_4 & 1 & a_4 \end{vmatrix}$$

When reduced by row operations to reduced row-echelon form, this solves for the following:

Result Matrix 1 (based on Equation 1 using $p_1$–$p_4$))

$$\begin{vmatrix} 1 & 0 & 0 & 0 & X'x \\ 0 & 1 & 0 & 0 & Y'x \\ 0 & 0 & 1 & 0 & Z'x \\ 0 & 0 & 0 & 1 & Ox \end{vmatrix}$$

To solve for the rest of X', Y', Z', and O, the same process is performed using equations (2) and (3), as follows:

Transformation of Matrix 2 into Result Matrix 2 (based on Equation 2 for ($p_1$–$p_4$))

$$\begin{vmatrix} a'_1 & b'_1 & c'_1 & 1 & b_1 \\ a'_2 & b'_2 & c'_2 & 1 & b_2 \\ a'_3 & b'_3 & c'_3 & 1 & b_3 \\ a'_4 & b'_4 & c'_4 & 1 & b_4 \end{vmatrix} \Rightarrow \begin{vmatrix} 1 & 0 & 0 & 0 & X'y \\ 0 & 1 & 0 & 0 & Y'y \\ 0 & 0 & 1 & 0 & Z'y \\ 0 & 0 & 0 & 1 & Oy \end{vmatrix}$$

Transformation of Matrix 3 into Result Matrix 3 (based on Equation 3 for ($p_1 p_4$))

$$\begin{vmatrix} a'_1 & b'_1 & c'_1 & 1 & c_1 \\ a'_2 & b'_2 & c'_2 & 1 & c_2 \\ a'_3 & b'_3 & c'_3 & 1 & c_3 \\ a'_4 & b'_4 & c'_4 & 1 & c_4 \end{vmatrix} \Rightarrow \begin{vmatrix} 1 & 0 & 0 & 0 & X'z \\ 0 & 1 & 0 & 0 & Y'z \\ 0 & 0 & 1 & 0 & Z'z \\ 0 & 0 & 0 & 1 & Oz \end{vmatrix}$$

As these row operations are all identical, these matrices can be combined by adding addition rows, yielding the following:

Transformation of Matrix 4 into Result Matrix 4 (based on Equation 1–3 for $(p_1-p_4)$)

$$\begin{vmatrix} a'_1 & b'_1 & c'_1 & 1 & a_1 & b_1 & c_1 \\ a'_2 & b'_2 & c'_2 & 1 & a_2 & b_2 & c_2 \\ a'_3 & b'_3 & c'_3 & 1 & a_3 & b_3 & c_3 \\ a'_4 & b'_4 & c'_4 & 1 & a_4 & b_4 & c_4 \end{vmatrix} \Rightarrow \begin{vmatrix} 1 & 0 & 0 & 0 & X'x & X'y & X'z \\ 0 & 1 & 0 & 0 & Y'x & Y'y & Y'z \\ 0 & 0 & 1 & 0 & Z'x & Z'y & Z'z \\ 0 & 0 & 0 & 1 & Ox & Oy & Oz \end{vmatrix}$$

Finally, the system is improved by replacing $p_4$ with a point derived from a cross-product of vectors based on $p_1$, $p_2$, and $p_3$. This eliminates the possibility of the points not sufficiently spanning the DRU Basis. By performing the same cross-product on both the $(a_n, b_n, c_n)$ points, and the $(a'_n, b'_n, c'_n)$ points, a consistent $(a_4, b_4, c_4)$ and $(a'_4, b'_4, c'_4)$ set are derived to describe the same imaginary point.

When the DRU locates previously observed points, it enters the new observed and the stored absolute positions for each point ($(a'_n, b'_n, c'_n)$ and $(a_n, b_n, c_n)$) into Matrix 4, which will give Result Matrix 4 and the new X', Y', Z', and O of the DRU.

With the position and orientation of the DRU point of reference known, all points can be given an updated absolute position $(a_n, b_n, c_n)$ if necessary, using Equation Set A.

Overview of Tertiary Process: Locating New Points in the DRU Basis

As described in previous sections, as the DRU's field of view changes, it will observe new points $p_n$ for which the positions in the DRU Basis are $(a'_n, b'_n, c'_n)$. The system will then plug these new values for $(a'_n, b_n, c'_n)$ into Equation Set A to determine the new $(a_n, b_n, c_n)$. The new absolute values will then be stored in the computer so the points can be used in subsequent iterations. In this way the system can track the movement of the DRU through the Absolute Basis.

Figure 3:
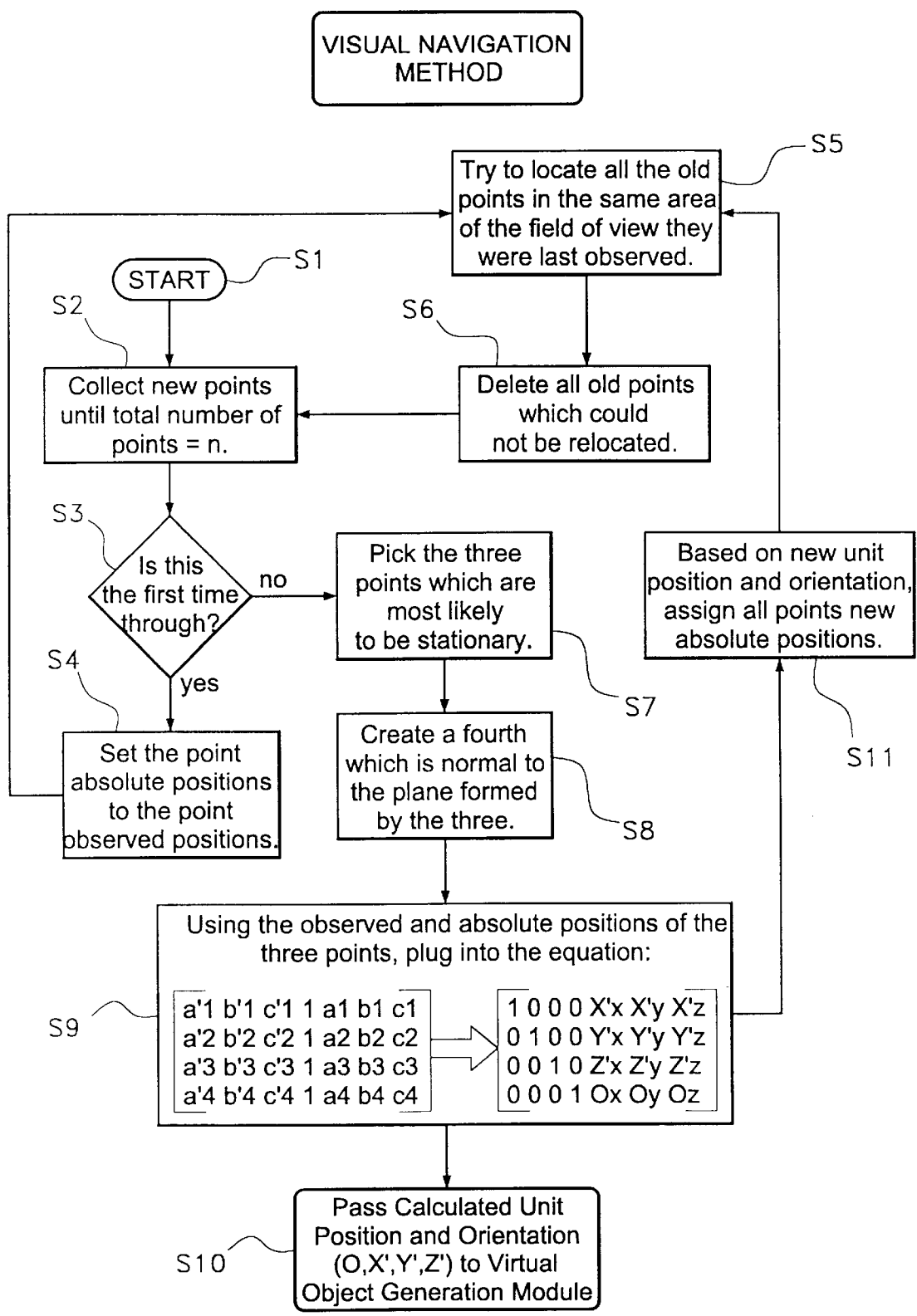
FIG. 3 is a flow diagram depicting the visual navigation method.

FIG. 3 is a flowchart of the program steps comprising visual navigation.

Recapitulating, at the Step S1, the system starts upon turn-on and is cleared and initialized whereupon the program advances to S2 where new points are collected until the desired number of points (n) are obtained. As was described hereinabove, the images are obtained and converted into pixels which are stored.

The stored images are scanned to identify distinctive points.

At S3, if this is the first iteration, the program jumps to S4 to set the point absolute positions. Then, at S5, an attempt is made to locate all the old points in the same area or field of view they were last observed. All old points which cannot be relocated are deleted at S6 at which time the program returns to S2 to collect new points until the total number of points equals n. Since this is the second time through the routine, the program jumps from S3 (which sets a flag after the first time through is established), and jumps to S7 at which three (3) points which are most likely to be stationary are selected. A fourth point is created at S8 which is normal to the plane formed by the three (3) points selected at S7. These points are "plugged" into the matrices at S9. The calculated unit position and orientation is transferred to the virtual object generation module at S10 and, when a new unit position is determined at S11 the program returns to S5.

Dual Reality Definition

Dual reality is the visual merging of real three-dimensional space (Observed Reality) with Supplemental Reality. Computer generated graphics are superimposed on a live stereoscopic video image in such a manner that any and all movement of the DRU through Observed Reality is reflected simultaneously by its movement in Supplemental Reality, creating an illusion of a single merged reality. Objects in Supplemental Reality can either be stationary, appearing in correct perspective relative to the participant, or can be moved around the field of view by computer, or both.

Figure 10:
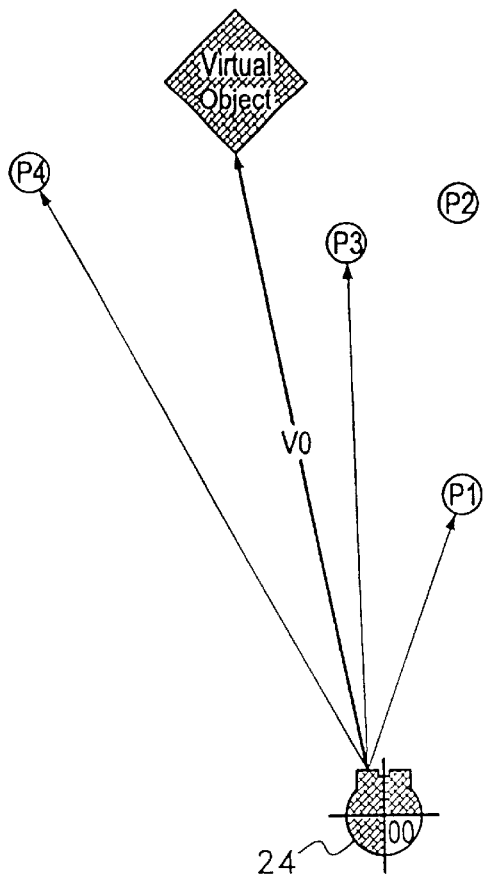

FIG. 10 shows the DRU 24 in the starting position (OO). The DRU has selected three points ($p_1$, $p_2$, $p_3$) and projects a Virtual Object on Vector O.

Figure 11:
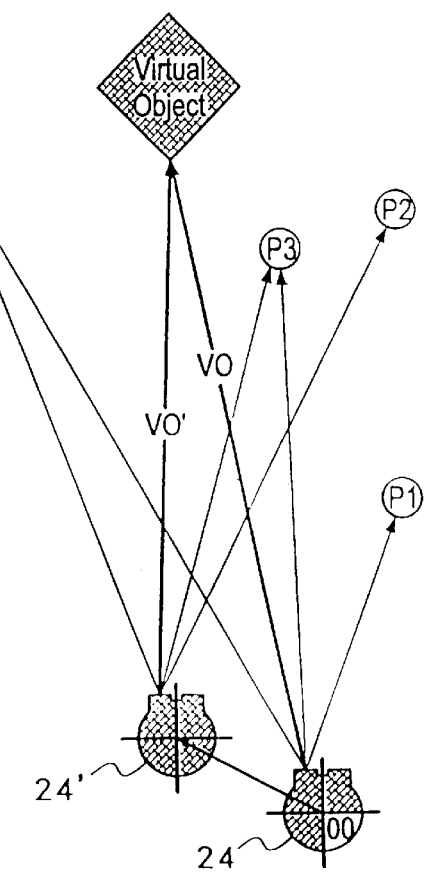

FIG. 11 shows the DRU 24 moved to its second position relative to the starting position 24'shown in FIG. 10. In this position the DRU has located points $p_3$ and $p_4$ and has further selected a new point ($p_2$). The Virtual Object is projected along vectors VO and VO' in the same position as is shown in FIG. 10.

Figure 12:
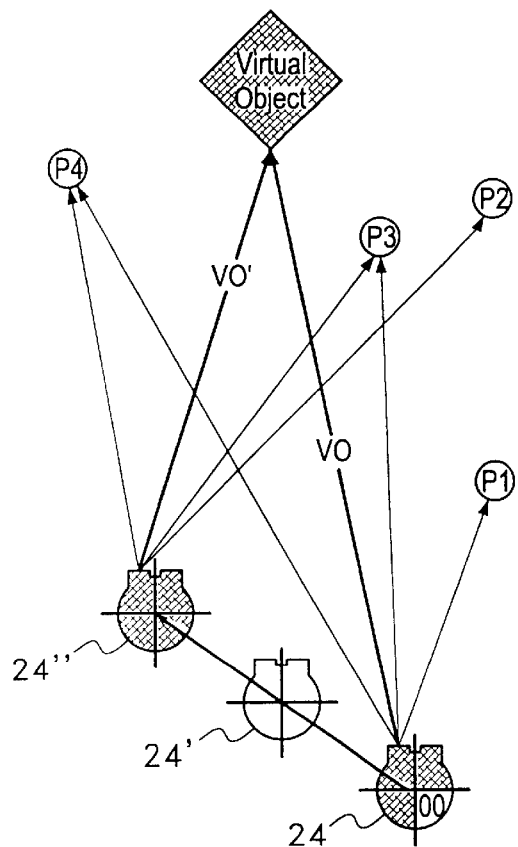

FIG. 12 shows the DRU moved to a third position relative to the starting position of FIG. 10. At this position, it has located points $p_2$, $p_3$ and $p_4$. The Virtual Object is projected along vector VO and VO' into the same position as shown in FIGS. 10 and 11.

Figure 13:
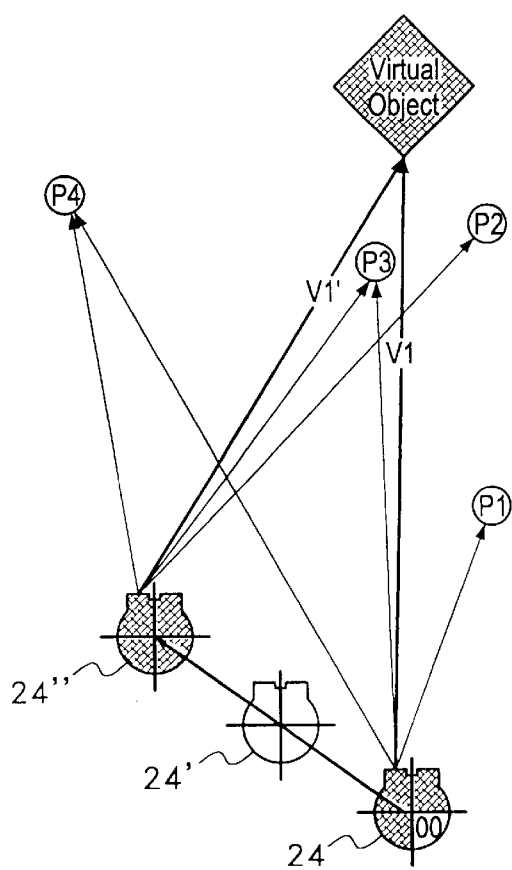

FIG. 13 shows the DRU in the same position 24"as in FIG. 12, but wherein the Virtual Object is projected along a new set of vectors (V1 and V1').

The above effect is achieved through the use of a self-contained headset 24, worn by the participant, independent of any external equipment or navigational aids, and is accomplished solely by the analysis of the stereoscopic video feed received from the unit 24 (i.e. by visual navigation). As an example, if the computer were to generate a Supplemental Reality cube suspended in mid-air, each surface could have a different color, as a participant walked around the cube so that the participant would be able to observe the different color in each respective side while walking around the computer generated cube.

Environment Mapping

Definition of Environment Mapping

Environment Mapping is a system in which the module that generates the supplemental reality is provided with information concerning the positions and orientations of surfaces existing in Observed Reality. This results in the two (2) realities being able to interact.

Calculation of the Orientation and Location of Surfaces

Figure 14:
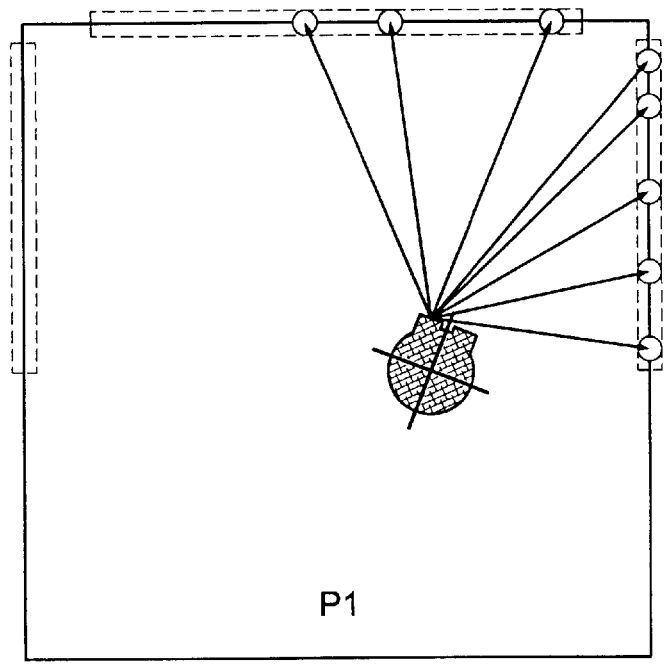
Figure 15:
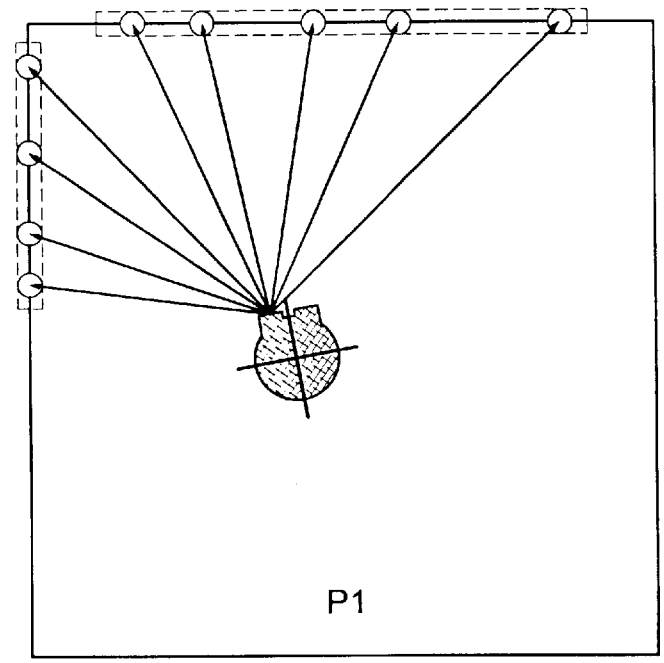

Calculation of the orientation and location of surfaces is accomplished by obtaining points in the same manner as described under Visual Navigation When an area of the field of view yields a sufficient number of points to reasonably assume they belong to a flat surface in observed reality, unit 24 will create a virtual plane in a position and with an orientation, as is shown in FIGS. 14 and 15. The coordinates of the plane are stored in the computer and are not displayed to the participant.

Figure 16:
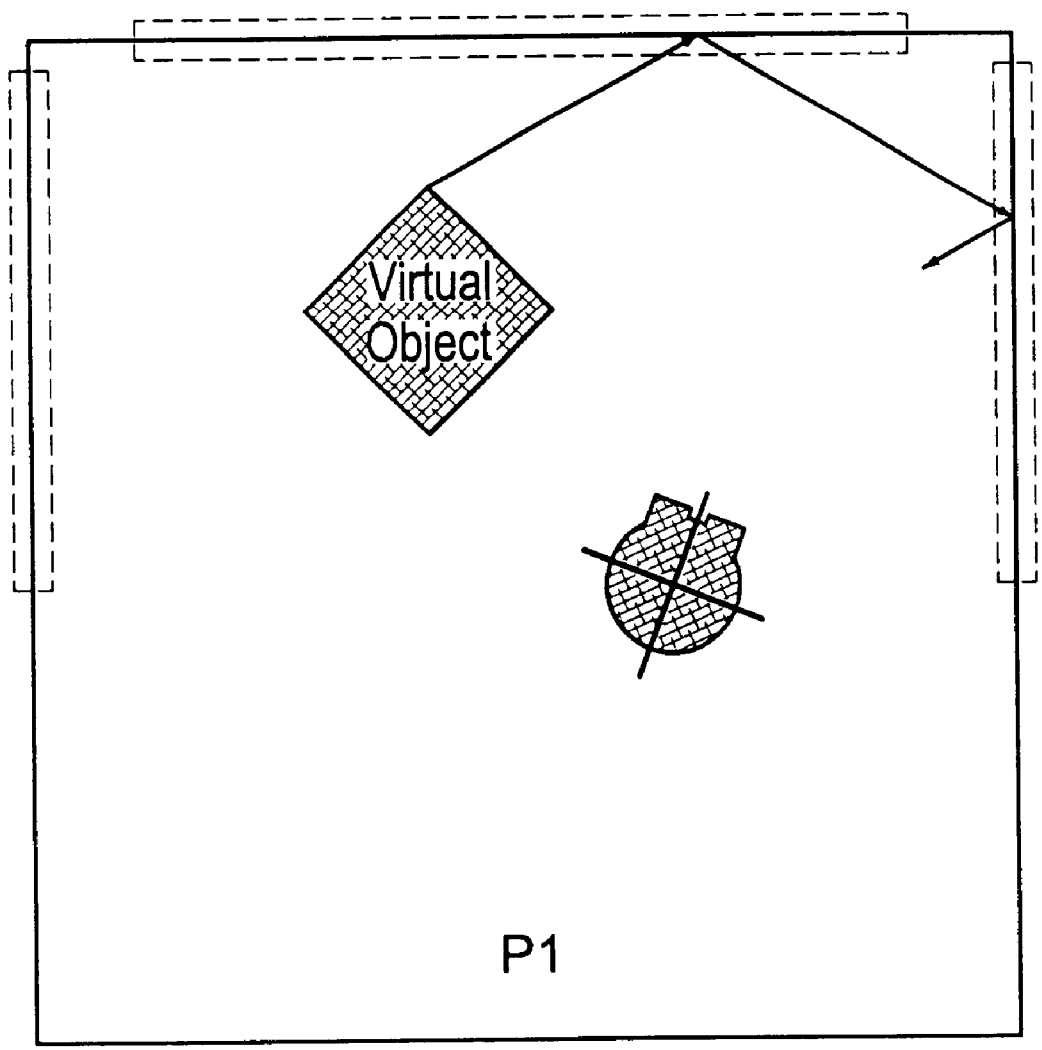

Once the virtual planes have been created, the Supplemental Objects can interact with them (e.g., a computer-generated object can be produced to give the effect of "bouncing off" a series of virtual planes corresponding to actual objects and surfaces), to create the effect of bouncing off "real" walls and objects within a room. Note also FIG. 16.

The process is also used to identify real objects interacting with the computer-generated objects in a dynamic manner. Using points which are identified on the near surface of the real object, unit 24 derives a three-dimensional model of the object and creates a matching virtual object (again only in the computer memory and not shown in the visor) which then interacts with the computer-generated object (e.g., if a participant attempted to hit the computer-generated image of a ball with his hand), the unit identifies the points on the observer's hand and, based on the placement of the ball in Supplemental Reality, determines that the two (2) objects overlap and cause an appropriate reaction wherein the ball could move, disappear or remain in position and the participant's hand appears to go "through" the object.

The system described hereinabove may be used independently by individuals or may be integrated into a Dual Reality network enabling multiple participants to interact with the Dual Reality as well as with each other.

Figure 2:
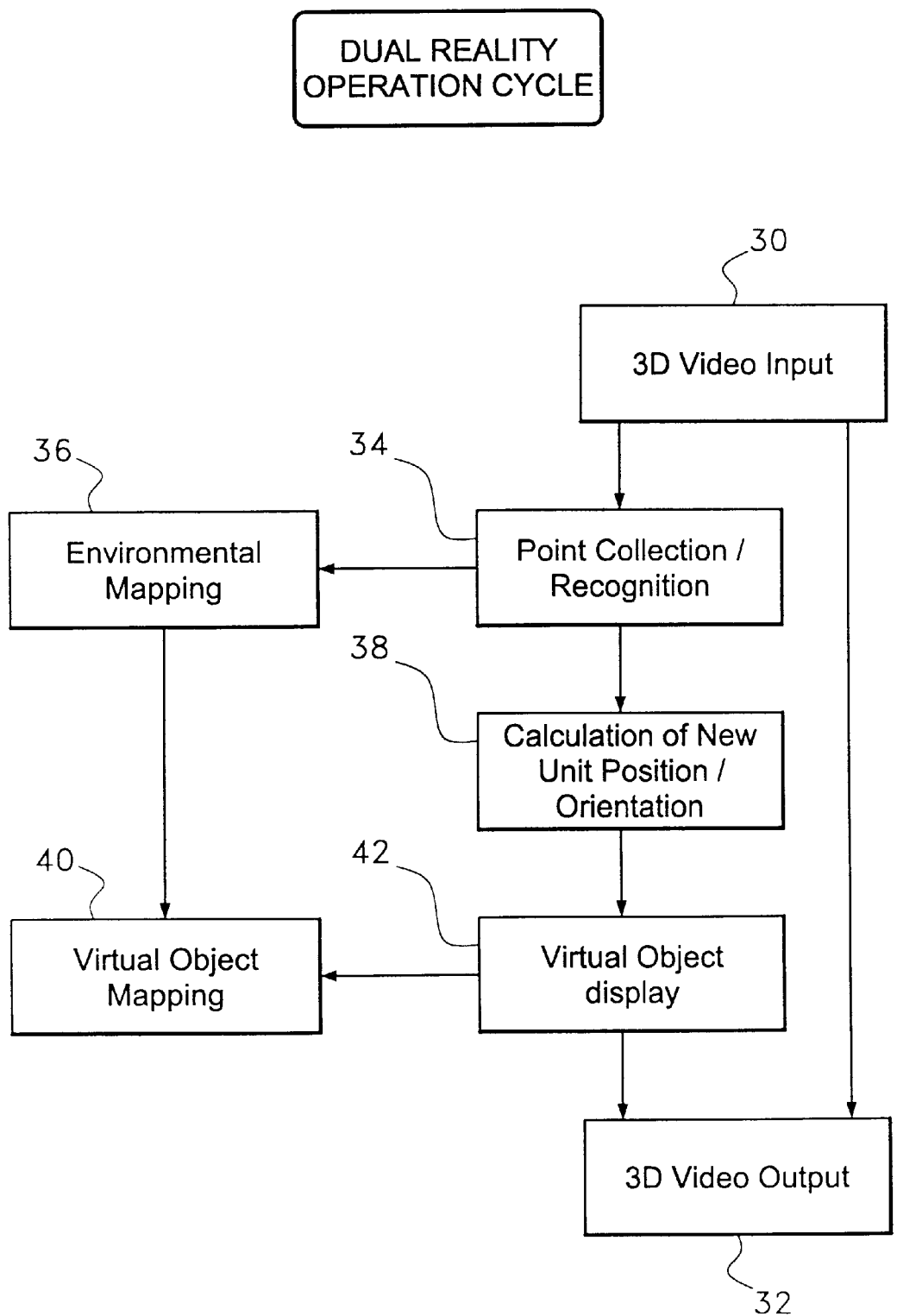
FIG. 2 is a block diagram showing the dual reality operating cycle.

Recapitulating, the Dual Reality operating cycle, and making reference to FIG. 2, the 3D video input 30 which is shown in simplified block diagram form as consisting of the video cameras shown in FIG. 1, obtain the video inputs and provide a 3D video display at output 32 as well as providing information at 34 for collecting and recognizing points in the real image which is formed by way of the memory devices, storing image frames and scanning these frames with an X by Y grid to identify points. These points are provided for environmental mapping purposes at 36 and for calculating position and orientation at 38. The environmental mapping function 36, performed by the computer, is utilized for generating the virtual object by the virtual object generator 40 to obtain the proper position and orientation relative to the real image. The position and orientation data determined at 38 and the virtual object generated at 40 is presented to the virtual object display 42 for presenting a display to the 3D video output 32.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A method for determining in real time a position and orientation of a camera pair based upon an observed environment within said camera pair's field of view comprising the steps of:

(a) obtaining an image of a region observed by each camera of said camera pair;

(b) identifying distinctive points in said image;

(c) determining current three dimensional positions of said distinctive points by comparing information obtained from each camera of said camera pair;

(d) analyzing said three-dimensional positions to determine position and orientation of said camera pair; and (e) repeating steps (c) and (d) at given intervals;

and further comprising:

discarding points identified during a given interval which are not identified in a subsequent interval.

2. The method of claim 1 further comprising replacing said discarded points in a random manner.

* * * * *